July 9, 1929.   J. J. M. GUEUX   1,720,597
MECHANISM FOR CONTROLLING LIQUID DISPENSERS
Filed April 28, 1927   3 Sheets-Sheet 3

INVENTOR
Joseph Jean Mazic Gueux.
By William E. Finton Attorney

Patented July 9, 1929.

1,720,597

UNITED STATES PATENT OFFICE.

JOSEPH JEAN MARIE GUEUX, OF IVRY, FRANCE.

MECHANISM FOR CONTROLLING LIQUID DISPENSERS.

Application filed April 28, 1927, Serial No. 187,217, and in France May 5, 1926.

The present invention concerns a controlling mechanism for liquid dispensers, particularly for gasoline, and of the type which is furnished with a receiver in the form of a receptacle which is entirely filled before each distribution and from which the liquid contained in a space below level corresponding to the quantity demanded is delivered.

On the interior of the receptacle consistent with the capacity thereof, are provided fixed levelling tubes, opening at different heights and each effecting the delivery of a determined quantity of liquid such as five, ten, fifteen or twenty liters, for example.

Each levelling tube is placed under the control of an independent cock operated by an oscillating lever. The mechanism conforming to the invention is designed to secure a rapid and simple control of these cocks but preventing the possibility of fraud or deceitful tactics.

This mechanism comprises essentially a shaft extending transversely with respect to the cocks and operated by a crank either directly or indirectly. This shaft carries a cam which is slidably mounted but disposed in such a manner as to participate in the rotation of the shaft. This cam can be brought before each of the oscillating levers of the cocks in a manner to effect the movement of the desired cock, by simple rotation of the transverse shaft by the operating crank.

This transverse shaft, or the organs which are in immediate relation with it, are furnished with devices which prevent the beginning of a dispensing operation before the receptacle be filled, the moving of the cam if it is not opposite a cock, the opening of two cocks at a time or the moving of the pump during a dispensing operation and finally the stopping of the dispensing operation before the quantity of liquid demanded has been effectively delivered.

Finally, this controlling mechanism is completed by a drain cock arranged similarly to the other cocks but disposed in such a manner as to prevent the formation of abnormal pressures in the receptacle.

An embodiment of the controlling mechanism conforming to the invention is represented, by way of example, in the accompanying drawing in which:—

Fig. 4 is a section of the drain cock taken along the line IV—IV of Fig. 3;

Fig. 6 is an enlarged fragmentary view of a portion of the device showing the construction of the manometric piston embodied in the invention.

Figure 1:
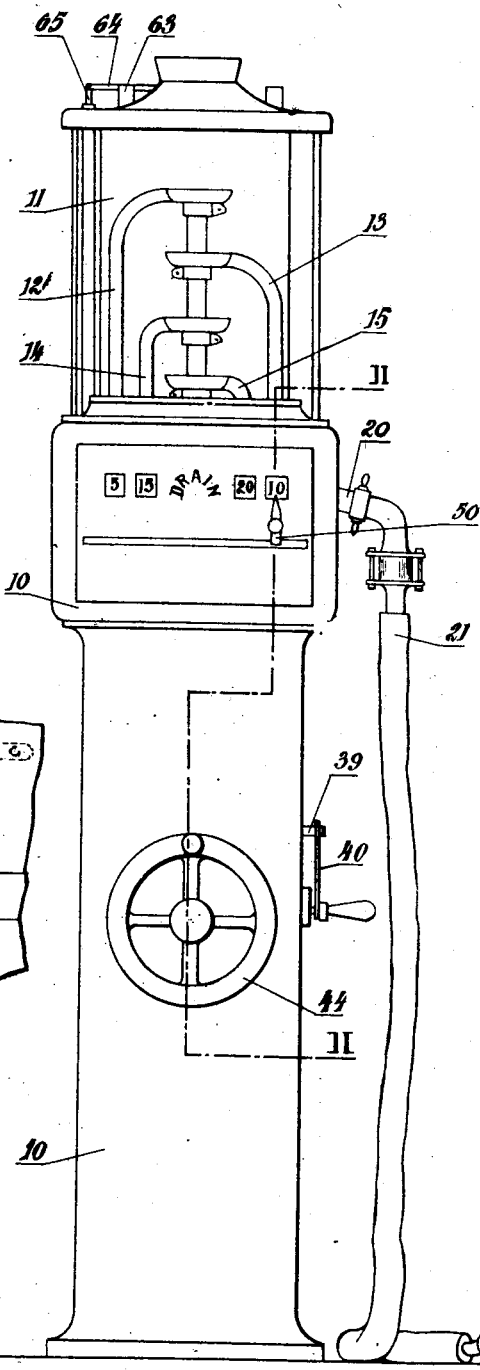
Fig. 1 is an exterior view of the liquid dispenser.

The complete dispensing device represented in Fig. 1 consists of a frame 10 on which is surmounted a glass receiver or receptacle 11, opening into the interior of which at different levels are the fixed levelling tubes 12, 13, 14 and 15, each effecting the delivery of a fixed quantity of liquid, for example, five liters for tube 12, ten liters for tube 13, fifteen liters for tube 14 and twenty liters for tube 15.

Figure 2:
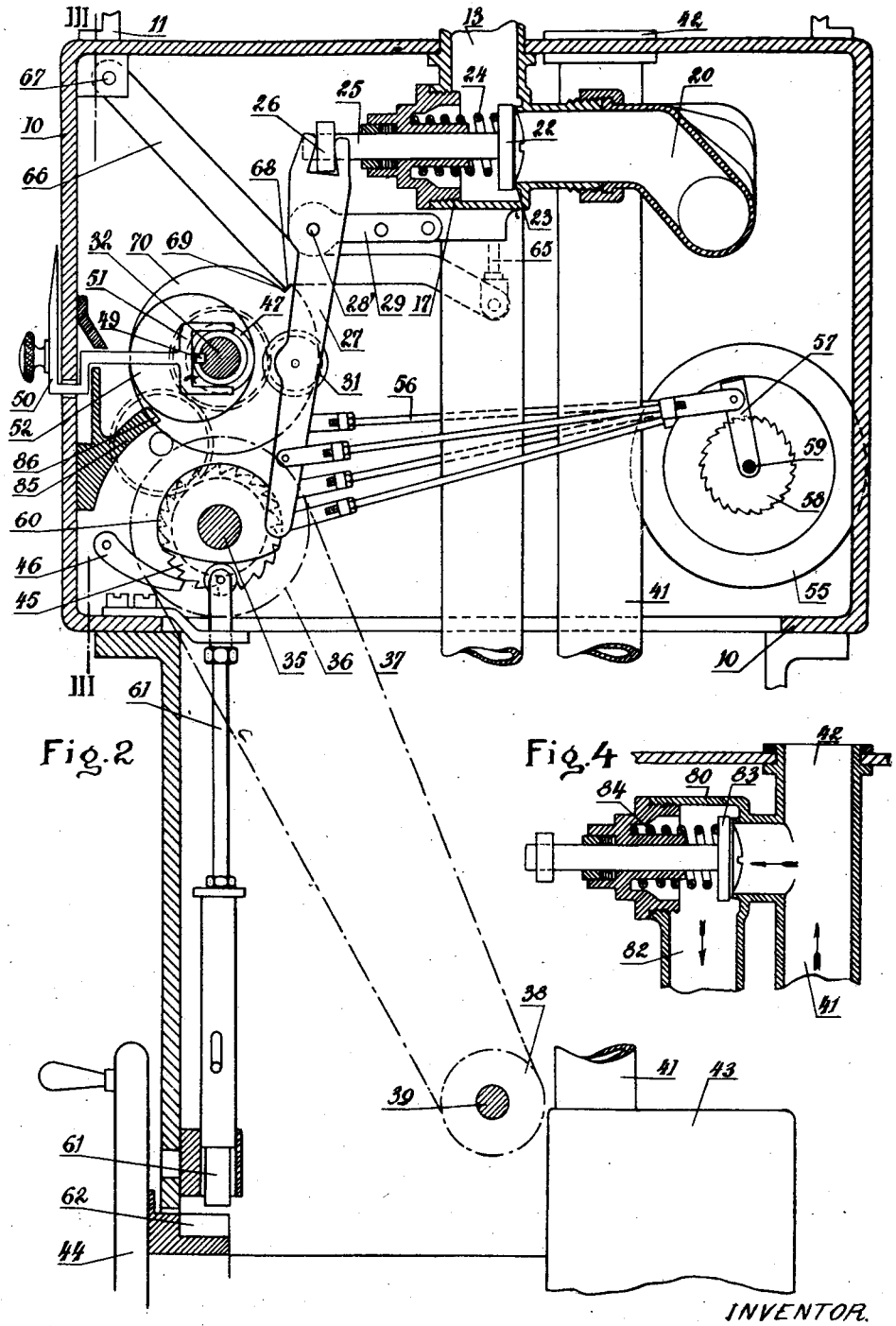
Fig. 2 is a section along the line II—II of Figs. 1 and 3 to a larger scale.
Figure 3:
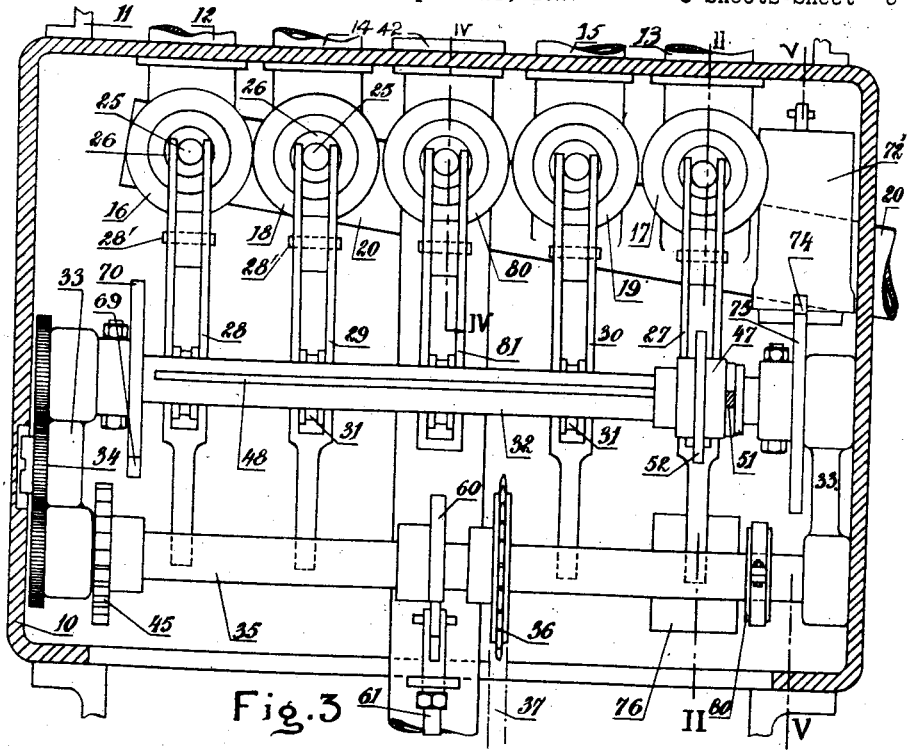
Fig. 3 is a section along the line III—III of Fig. 2.

These four levelling tubes extend through the bottom of receptacle 11 as shown in Fig. 3 and are individually placed under the control of an independent cock. These four cocks are respectively designated by 16, 17, 18 and 19 in Fig. 3. These cocks are identical in construction and are all mounted in the same manner upon their respective discharge tubes which they control. Fig. 2 shows a section of the cock 17 and it is obvious that a description of this cock will suffice for the other three.

The body of valve 17 is disposed between the tube 13 and a discharge pipe 20 which appears on the exterior as shown in Fig. 1 and to which is connected a flexible dispensing tube 21.

As shown in Fig. 3 the discharge pipe 20 is common to the four cocks 16 to 19.

Each cock is furnished with a valve 22, held against its seat 23 by a spring 24. This valve has a stem 25 which projects through the cock to the exterior and is attached to the extremity of a lever 27 at 26 pivoted on a shaft 28' carried by a rigid projection 29 of the cock.

Thus for each of the cocks 16 to 19 there is a corresponding oscillating lever 27 to 30. (See Fig. 3.)

In conformity with the invention, each oscillating lever 27 to 30 carries a roller 31 and at the same level as the line of rollers thus formed extends a transverse shaft 32 capable of turning in suitable end bearings 33 attached to the frame 10 and which is controlled by a crank 40 (Fig. 1) through the medium of gears 34, an auxiliary arbor or shaft 35, a toothed wheel 36, a chain 37, a pinion 38 (Fig. 2) and an arbor 39, the extremity of which projects through to the exterior as shown in Fig. 1.

The receptacle 11 is fed with liquid by means of a pipe 41 which opens into the lower part of the receptacle at 42. This pipe 41 leads to a pump 43 which, in the example shown, is controlled by an operating hand-wheel 44 (Figs. 1 and 2).

Auxiliary arbor 35 and consequently shaft 32 are permitted to rotate in only one direction by means of the ratchet wheel 45 and a retaining pawl 46 (Fig. 2).

The respective diameters of wheel 36 and pinion 38 are such that when the crank 40 is given a complete turn, the arbor 35 and consequently the shaft 32 only executes a half-turn.

The shaft 32 carries a collar 47 capable of sliding on it but disposed in such a manner as to rotate with it by means, for example, of a key 49 engaging a key-way 48 in the shaft 32. The collar 47 is adapted to be displaced manually on the shaft 32 by means of a pointer 50 on the exterior of the device (Figs. 1 and 2) and terminating on a fork 51 engaging a suitable groove in the collar 47. This collar is furnished with a circular cam 52 eccentrically mounted with respect to the shaft 32.

The general function of the mechanism thus far described is as follows:

In order to effect the dispensing of a given quantity of liquid, say ten liters for example, the index 50 is placed in the corresponding position as shown in Fig. 1. This operation results in bringing the cam 52 before the roller 31 on the oscillating lever 27 which controls the cock 17 of tube 13 corresponding to the ten liter dispensing level.

By manipulating the hand-wheel 44 which operates the pump 43, the receptacle 11 is completely filled. The crank 40 is then given a complete turn. As above pointed out, the shaft 32 makes a half-turn and the cam 52 pushes back the roller 31. The lever 27 oscillates on its pivot 28' and draws the stem 25 of the valve 22 back against the action of the spring 24.

This movement has for a purpose to place the tube 13 into communication with the discharge pipe 20 and all of the liquid contained above the upper end of the tube 13 runs through the discharge pipe 20 and the distributing hose 21.

The receptacle 11 is so designed that the volume of the liquid will be exactly the ten liters required. For dispensing twenty liters the device works the same way provided the index 50 is moved to the corresponding point inscribed on the exterior of the dispenser. The cock 19 would then be operated.

When the dispensing operation is finished, the crank 40 is given a complete turn, the shaft 32 and the cam 52 making a half-turn and the valve 22 under the action of spring 24 is reseated in its closing position.

Different means are provided for informing and protecting the proprietor of the dispenser as well as the customer buying the liquid dispensed.

First of all, a counter having a totalizer 55 (Fig. 2) is disposed in a well known manner for registering and totalizing the quantities of liquids dispensed. This counter is actuated by the oscillating levers 27 to 30 operating the cocks, through the medium of rods 56 connected to four pawls 57 acting on four ratchet wheels 58 mounted on the shaft 59 of the counter. The points of attachment of the rods 56 vary for each cock as it is obvious that the counter must turn through a larger angle when moved by cock 19 which corresponds to the dispensing of twenty liters than when moved by cock 17 which corresponds only to ten liters.

A device is further provided to prevent the feeding of the receptacle once the dispensing operation has been commenced, that is, when the shaft 32 has been turned. This device comprises essentially a cam 60 (Fig. 2) carried by the auxiliary arbor 35 and acts on a rod 61 which is adapted to engage one of the recesses 62 carried by the hub of the hand wheel 44 of the pump 43. The function of this device is obvious.

Another means is provided for preventing the rotation of cam 52 in case it is not placed exactly opposite a cock. This device consists of a guide-bar 85 (Fig. 2) extending parallel to the shaft 32 and furnished with slots 86 placed in the vertical plane of each cock. This guide bar prevents rotation of cam 52 when it is not opposite one of the slots 86 and consequently not in the vertical plane of one of the cocks.

The construction of the rollers 31 of the oscillating levers provides a means for preventing the opening of a second cock after a cock has already been opened. (Fig. 3.) It follows that as soon as the cam 52 comes in contact with one of the rollers 31, even if it is not guided by one of the slots 86, it is nevertheless not possible to slide the cam along the shaft 32, inasmuch as it is engaged between the sides of the groove in the roller.

Another means is provided for preventing a dispensing operation from being started until the receptacle 11 is completely filled. This device comprises a manometrical piston 63 (Figs. 1 and 6) of well known construction consisting of a spring pressed piston 63', placed on the upper part of the receptacle and acted upon by the pressure therein, and connected by means of a lever 64 and a rod 65 (Figs. 2 and 6) to a lever 66 pivoted at 67 to the frame 10 and presenting an extremity 68 in cooperation with the shoulder 69 of a disc 70 fixed to the shaft 32 (Figs. 2 and 3). Thus when the receptacle is not completely filled, that is, as long as the manometrical piston 63 is not raised, the extremity 68 of the lever 66 abuts the shoulder 69 of the disc 70. The rotation of shaft 32 cannot take place and the opening of any of the cocks is impossible.

Figure 5:
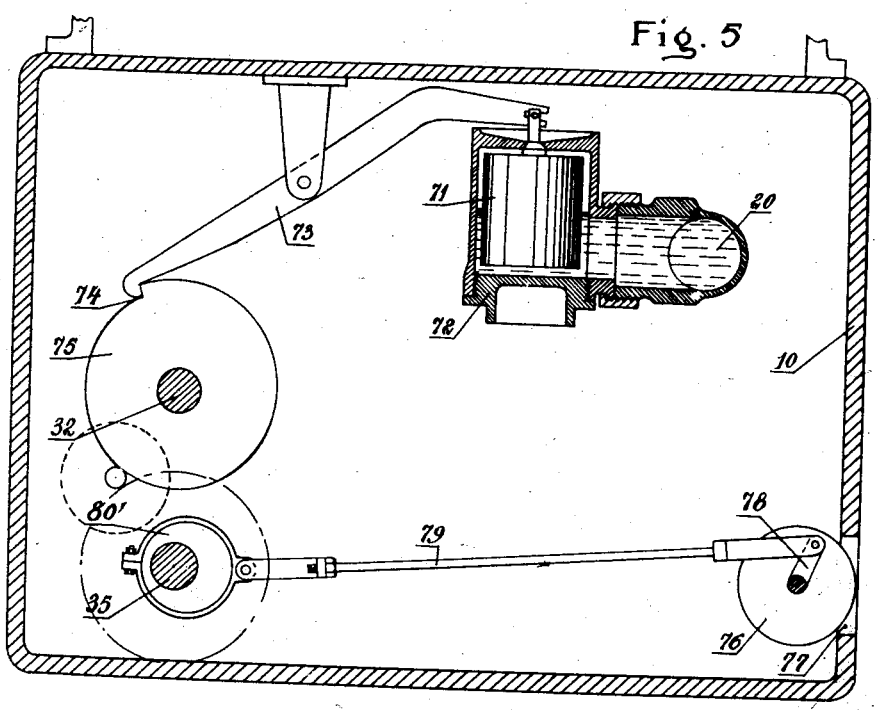
Fig. 5 is a section along the line V—V of Fig. 3.

Finally a safety device is represented in Fig. 5. Once a dispensing operation has been started, this device prevents its interruption before it has been carried through to the finish and comprises a float 71 contained in a chamber 72 communicating with the discharge pipe 20. This float is attached to a lever 73 furnished with a hook 74, cooperating with a cam disc 75, fixed to the shaft 32, like the disc 70. Thus, as soon as a dispensing operation has been started, that is, as soon as the liquid starts to flow in the pipe 20, the float 71 is raised and the lever 73 prevents shaft 32 from being turned, to close the dispensing cock previously opened, by means of its hook 74.

With regard to the last two devices described, it will be noticed that when the extremity 68 of lever 66 engages the shoulder 69 of disc 70 the hook 74 of lever 73 is disengaged from the shoulder of disc 75 and 180° distant therefrom.

Fig. 5 also shows a device adapted to inform the customer whether the dispensing operation is continuing or completed. This device comprises a cylinder 76, part of which is visible from the exterior through a window 77 in the frame 10. The visible part of the cylinder is controlled by means of the auxiliary arbor 35 through the medium of a crank 78, a connecting rod 79 and an eccentric 80.

Thus when a dispensing operation is being performed or has been terminated, the eccentric 80' is displaced accordingly hence varying the position of cylinder 76 and modifying the inscription visible through the window 77.

The apparatus is completed by a drain cock 80 (Figs. 3 and 4) disposed in the same manner as cocks 16 to 19. The cock 80 has a corresponding oscillating lever 81 (Fig. 3) and a grooved roller 31 cooperating with the cam 52.

This drain cock 80 is connected between a return pipe 82 leading to the supply tank of the liquid and the feed pipe 41. As shown Fig. 4, the result of the arrangement of this cock is, that when the receptacle 11 is completely filled, and the operation of the pump is continued, the pressure existing in the pipe 41 pushes back the valve 83 against the action of spring 84 and the surplus liquid flows through the return pipe 82. Thus the receptacle 11 is protected from abnormal pressures. To accomplish this result, the spring 84 must obviously be suitably designed.

It follows from the foregoing description, that the mechanism is relatively simple and not costly to construct and that the whole liquid dispenser can be in a rapid manner without the possibility of fraud or deceitful tactics.

The invention is not limited to the example disclosed the construction of which could undergo modifications of details thus in the apparatus represented, a turn of the crank 40 might serve to open a cock and a second turn to close it. It is also obvious that wheel 36 and pinion 38 might be given the same number of teeth, obtaining the opening of the cock in a half turn of the crank and closing it in a half turn. Under these conditions the handle of the crank 40 would be adapted to abut against two diametrically disposed stops at each end of its stroke.

I claim:

1. A liquid dispensing apparatus comprising a receptacle, a plurality of discharge tubes fixedly mounted within the receptacle, an independent cock for each of said tubes, a rotatable shaft transversely disposed with respect to the cocks, a cam slidably mounted on said shaft and adapted to rotate therewith, and means engageable with said cam and projecting outside the dispensing apparatus whereby the cam may be brought into engagement with any one of said cocks.

2. A liquid dispensing apparatus comprising a receptacle, means for filling the receptacle, a plurality of discharge pipes mounted within the receptacle, a cock for each of said tubes, a rotatable shaft transversely disposed with respect to the cocks, and carrying a cam adapted to be brought into engagement with any one of said cocks for dispensing a desired quantity of liquid, and means actuated by said cam shaft to prevent the inlet of liquid into the receptacle during the dispensing operation, said means including a rod moved into locking engagement with the receptacle filling means.

3. A liquid dispensing apparatus comprising a receptacle, a plurality of discharge tubes mounted within the receptacle, an independent cock for each of said tubes, a rotatable shaft transversely disposed with respect to the cocks and carrying a cam slidably mounted to rotate therewith and adapted to be brought into engagement with any one of the cocks, and means for preventing the rotation of said cam shaft when the cam is at points intermediate of the cocks.

4. A liquid dispensing apparatus comprising a receptacle, a plurality of discharge tubes mounted within the receptacle, an independent cock for each of said tubes, a shaft transversely disposed with respect to said cocks, and carrying a cam slidably mounted to rotate therewith and adapted to be brought into engagement with any one of said cocks, a disc secured to said cam shaft and means engageable with the disc for holding the cam shaft against rotation until the receptacle is completely filled.

5. A liquid dispensing apparatus comprising a receptacle, a plurality of discharge tubes mounted within the receptacle, an independent cock for each of said tubes, a rotatable shaft transversely disposed with respect to said cocks and carrying a cam slidably mounted to rotate therewith and adapted to be brought into engagement with any one of said cocks for dispensing a desired quantity of liquid, a disc carried by said cam shaft, and means engageable with the disc for preventing the further rotation of the cam shaft during the dispensing of the desired quantity of liquid.

6. A liquid dispensing apparatus comprising a receptacle, a plurality of discharge tubes mounted within the receptacle, an independent cock for each of said tubes, a rotatable shaft transversely disposed with respect to the cocks and carrying a cam mounted to rotate therewith and adapted to be brought into engagement with any one of the cocks, and a bar extending parallel with said cam shafts and having a recess placed in the vertical plane of each cock for allowing the rotation of the shaft only when the cam is in direct alinement with the cocks.

7. A liquid dispensing apparatus comprising a receptacle, a plurality of discharge tubes mounted within the receptacle, an independent cock for each of said tubes, a rotatable shaft transversely disposed with respect to the cocks and carrying a cam mounted to rotate therewith and adapted to be brought into engagement with any one of the cocks, means for preventing rotation of the cam shaft until the receptacle is completely filled, and manometric means arranged on the receptacle for actuating said shaft preventive rotating means.

8. A liquid dispensing apparatus comprising a receptacle, a plurality of discharge tubes mounted within the receptacle, an independent cock for each of said tubes, a shaft transversely disposed with respect to said cocks, and carrying a cam mounted to rotate therewith and adapted to be brought into engagement with any one of said cocks, a shouldered disk secured to said cam shaft, a manometric piston mounted on the receptacle, and a lever operatively connected to the manometric piston and engageable with the shouldered disk for holding said cam shaft against rotation until the receptacle is completely filled.

9. A liquid dispensing apparatus comprising a receptacle, a plurality of discharge tubes mounted within the receptacle, an independent cock for each of said tubes, a shaft transversely disposed with respect to said cocks, and carrying a cam mounted to rotate therewith and adapted to be brought into engagement with any one of said cocks, for dispensing a desired quantity of liquid, a disk carried by said cam shaft, a float mounted within the receptacle, and a lever actuated by said float and engageble with the disk for preventing further rotation of the cam shaft during the dispensing of the desired quantity of liquid.

10. A liquid dispensing apparatus comprising in combination a receptacle, a supply tank therefor, feed and return pipes between the receptacle and the tank, a plurality of discharge tubes in said receptacle, an independent cock for each of said tubes, a rotatable shaft transversely disposed with respect to said cocks and carrying a cam mounted to rotate therewith and adapted to be brought into engagement with any one of said cocks, a drain cock interconnecting said feed and return pipes, and adapted to be selectively engaged by the cam of the rotatable shaft, and valve means associated with said drain cock for preventing abnormal pressure within the receptacle.

In witness whereof I have hereunto set my hand.

JOSEPH JEAN MARIE GUEUX.